(12) United States Patent
Hui et al.

(10) Patent No.: US 9,921,925 B2
(45) Date of Patent: Mar. 20, 2018

(54) METHOD AND APPARATUS FOR RECOVERING ABNORMAL DATA IN INTERNAL MEMORY

(71) Applicant: Huawei Technologies Co., Ltd., Shenzhen, Guangdong (CN)

(72) Inventors: Weifeng Hui, Xi'an (CN); Xiaogang Zhu, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 490 days.

(21) Appl. No.: 14/579,577

(22) Filed: Dec. 22, 2014

(65) Prior Publication Data
US 2015/0113323 A1    Apr. 23, 2015

Related U.S. Application Data

(63) Continuation of application No. PCT/CN2013/085129, filed on Oct. 12, 2013.

(30) Foreign Application Priority Data

Apr. 22, 2013 (CN) .......................... 2013 1 0140972

(51) Int. Cl.
G06F 11/00     (2006.01)
G06F 11/20     (2006.01)
(Continued)

(52) U.S. Cl.
CPC ...... G06F 11/2017 (2013.01); G06F 9/30145 (2013.01); G06F 11/07 (2013.01);
(Continued)

(58) Field of Classification Search
CPC ............. G06F 11/1402; G06F 11/1405; G06F 11/1407; G06F 11/141; G06F 9/30145; G06F 9/3867
(Continued)

(56) References Cited

U.S. PATENT DOCUMENTS 5,146,569 A     9/1992  Yamaguchi et al.
5,884,100 A *   3/1999  Normoyle ........... G06F 12/0897
                                                            710/52
(Continued)

FOREIGN PATENT DOCUMENTS

CN         1773443 A      5/2006
CN       101046739 A     10/2007
(Continued)

*Primary Examiner* — Elmira Mehrmanesh (57) ABSTRACT

The present invention discloses a method and an apparatus for recovering abnormal data in an internal memory. The method includes: receiving, by a processor, a data abort signal and an address of an abnormal instruction where abnormal data is located; suspending a current instruction being executed, and recording an address pointed to by a computer pointer; obtaining a program unit currently being executed by the processor; if it is determined that the abnormal instruction belongs to the program unit and that instructions between the first instruction and the current instruction in the program unit are all reversible instructions, invoking a destruction program unit corresponding to the program unit, so as to release resources already applied for by the program unit; and causing the computer pointer to point back to an address of the first instruction in the program unit, and re-executing the program unit.

10 Claims, 4 Drawing Sheets

(51) Int. Cl.
*G06F 11/07* (2006.01)
*G06F 11/14* (2006.01)
*G06F 9/30* (2018.01)

(52) U.S. Cl.
CPC ...... *G06F 11/0706* (2013.01); *G06F 11/0778* (2013.01); *G06F 11/14* (2013.01); *G06F 11/141* (2013.01); *G06F 11/1438* (2013.01); *G06F 11/1479* (2013.01); *G06F 2201/86* (2013.01)

(58) Field of Classification Search
USPC ...................................... 714/16, 17
See application file for complete search history.

(56) References Cited

U.S. PATENT DOCUMENTS

| | | | | |
|---|---|---|---|---|
| 6,701,413 B2* | 3/2004 | Shirai | ............. | G11B 19/04 710/260 |
| 8,131,976 B2* | 3/2012 | Doing | ............. | G06F 9/322 711/203 |
| 8,161,016 B2* | 4/2012 | Masuda | ............. | G06F 17/30377 707/703 |
| 8,522,000 B2* | 8/2013 | Shebanow | ............. | G06F 9/327 712/225 |
| 9,086,969 B2* | 7/2015 | Bekiroglu | ............. | G06F 11/36 |
| 2006/0101216 A1 | 5/2006 | Kobayashi et al. | | |
| 2007/0043531 A1* | 2/2007 | Kosche | ............. | G06F 11/3447 702/182 |
| 2007/0174185 A1* | 7/2007 | McGoveran | ............. | G06F 11/1474 705/39 |
| 2010/0037094 A1 | 2/2010 | Bak et al. | | |
| 2010/0131796 A1* | 5/2010 | Engelbrecht | ............. | G06F 9/30145 714/15 |
| 2011/0145637 A1* | 6/2011 | Gray | ............. | G06F 11/141 714/15 |
| 2013/0339963 A1* | 12/2013 | Greiner | ............. | G06F 9/466 718/102 |
| 2014/0059333 A1* | 2/2014 | Dixon | ............. | G06F 9/3004 712/244 |

FOREIGN PATENT DOCUMENTS

| | | | | |
|---|---|---|---|---|
| CN | 101075184 A | 11/2007 | | |
| CN | 103226499 A | 7/2013 | | |
| EP | 2854032 A1 * | 4/2015 | ......... | G06F 9/30145 |

* cited by examiner

METHOD AND APPARATUS FOR RECOVERING ABNORMAL DATA IN INTERNAL MEMORY

CROSS-REFERENCE TO RELATED APPLICATION

This application is a continuation of International Application No. PCT/CN2013/085129, filed on Oct. 12, 2013, which claims priority to Chinese Patent Application No. 201310140972.6, filed on Apr. 22, 2013, both of which are hereby incorporated by reference in their entireties.

TECHNICAL FIELD

The present invention relates to the field of a data recovery technology, and in particular, to a method and an apparatus for recovering abnormal data in an internal memory.

BACKGROUND

A RAM (random access memory, random access memory) has merits such as random storage and high-speed access. Therefore, the RAM is commonly used as an internal memory in a telecommunications device and an IT device. Based on features of the RAM, the RAM has three major failure modes:
  hard failure: irrecoverable physical failure that occurs inside a device, where a fault is not removable until a failed hardware unit is replaced;
  pseudo hard failure: logical deadlock that occurs in a hardware unit inside a device, where power-on and power-off operations and the like are required to remove a fault and restore normal running, and the pseudo hard failure is a non-physical hard failure and needs no replacement of the hardware unit; and
  soft failure: when energetic subatomic particles pass through silicon in a storage unit of a very large-scaled integrated circuit, free charges are generated concomitantly, and the charges concentrate in a circuit node in a very short time interval (about 15 ps), and, when the concentration exceeds a specific extent, stored data will change, which leads to a system error, but a damage caused by the soft failure to a circuit is not permanent, and the circuit can be restored by writing correct data back into a failed region.

With increasing miniaturization and integration of the telecommunications device and the IT device, the probability of soft failure of a RAM is higher and higher. In the prior art, when data is read in a RAM, a check algorithm, such as a parity check algorithm, and an ECC (error correcting code, Error Correcting Code) correction algorithm, is used to check whether the read data has varied, so as to check whether soft failure occurs in a storage space that stores the data. If soft failure occurs in the space that stores the data, the data is abnormal and a CPU performs a system resetting operation to recover the abnormal data.

In long-term research, it is found that: using a system resetting mode to recover abnormal data caused by soft failure in a RAM is equivalent to restarting the system to resume an initial state of the system, application software started in a process of using the system is shut down, which brings huge impact onto operations and results in a long recovery time.

SUMMARY

A main technical issue to be solved by embodiments of the present invention is to provide a method and an apparatus for recovering abnormal data in an internal memory, which can increase a speed of recovering abnormal data in an internal memory.

According to a first aspect, a method for recovering abnormal data in an internal memory is provided, including: receiving, by a processor, a data abort signal and an address of an abnormal instruction where abnormal data is located, where the abnormal data is stored in an internal memory; suspending, by the processor, a current instruction being executed, and recording an address pointed to by a computer pointer; obtaining, by the processor according to the address pointed to by the computer pointer, a program unit currently being executed by the processor; determining, by the processor according to the address of the abnormal instruction, whether the abnormal instruction belongs to the program unit; if the abnormal instruction belongs to the program unit, determining, by the processor, whether instructions between a first instruction and the current instruction in the program unit are all reversible instructions, where the reversible instructions mean that the instructions include no destructive operation; if the instructions between the first instruction and the current instruction in the program unit are all reversible instructions, invoking, by the processor, a destruction program unit corresponding to the program unit, so as to release resources already applied for by the program unit; and causing, by the processor, the computer pointer to point back to an address of the first instruction in the program unit, and re-executing the program unit, so as to recover the abnormal data in the internal memory.

With reference to the first aspect, in a first possible implementation manner of the first aspect, the step of the determining, by the processor, whether instructions between a first instruction and the current instruction in the program unit are all reversible instructions includes: determining, by the processor, whether the program unit is reversible, where reversibility of the program unit means that no instruction in the program unit includes a destructive operation; and if the program unit is irreversible, obtaining, by the processor, an address of a first irreversible instruction in the program unit, and determining whether the address of the first irreversible instruction is after the address pointed to by the computer pointer; and the step of invoking, by the processor if the instructions between the first instruction and the current instruction in the program unit are all reversible instructions, a destruction program unit corresponding to the program unit, so as to release resources already applied for by the program unit includes: if the program unit is reversible or the address of the first irreversible instruction is after the address pointed to by the computer pointer, invoking, by the processor, the destruction program unit corresponding to the program unit, so as to release the resources already applied for by the program unit.

With reference to the first possible implementation manner of the first aspect, in a second possible implementation manner of the first aspect, the step of determining, by the processor, whether the program unit is reversible includes: obtaining, by the processor, a reversible matrix of the program unit, and querying whether the program unit is reversible in the reversible matrix of the program unit, where the reversible matrix includes reversibility information of the program unit; and the step of obtaining, by the processor, an address of a first irreversible instruction in the program unit includes: obtaining, by the processor, a start address of the program unit, and obtaining an offset of the first irreversible instruction from the reversible matrix; and using, by the processor, a sum of the start address and the offset as the address of the first irreversible instruction.

With reference to the first aspect, in a third possible implementation manner of the first aspect, the internal memory includes a buffer memory and a random access memory; and after the step of invoking, by the processor, a destruction program unit corresponding to the program unit, and, before the step of causing, by the processor, the computer pointer to point back to an address of the first instruction in the program unit, the method further includes: obtaining, by the processor from a cache-storage mapping table, a cache address of data in the instructions between the first instruction and the current instruction in the program unit, and setting a cache space pointed to by the cache address in the buffer memory to be invalid.

With reference to the third implementation manner of the first aspect, in a fourth possible implementation manner of the first aspect, the buffer memory includes a level-1 buffer memory and a level-2 buffer memory.

With reference to the first aspect, in a fifth possible implementation manner of the first aspect, if an irreversible instruction exists between the first instruction and the current instruction in the program unit, or the abnormal instruction does not belong to the program unit, the processor performs a system resetting operation, so as to recover the abnormal data in the internal memory.

According to a second aspect, an apparatus for recovering abnormal data in an internal memory is provided, including: a receiving module, configured to receive a data abort signal and an address of an abnormal instruction where abnormal data is located, where the abnormal data is stored in an internal memory; a suspending and recording module, configured to suspend a current instruction being executed, and record an address pointed to by a computer pointer; an obtaining module, configured to obtain, according to the address pointed to by the computer pointer, a program unit currently being executed by the processor; a first determining module, configured to determine, according to the address of the abnormal instruction, whether the abnormal instruction belongs to the program unit; a second determining module, configured to: if the first determining module determines that the abnormal instruction belongs to the program unit, determine whether instructions between a first instruction and the current instruction in the program unit are all reversible instructions, where the reversible instructions mean that the instructions include no destructive operation; and a releasing module, configured to: if the second determining module determines that the instructions between the first instruction and the current instruction in the program unit are all reversible instructions, invoke a destruction program unit corresponding to the program unit, so as to release resources already applied for by the program unit; and a re-pointing module, configured to cause the computer pointer to point back to an address of the first instruction in the program unit, so as to re-execute the program unit and recover the abnormal data in the internal memory.

With reference to the second aspect, in a first possible implementation manner of the second aspect, the second determining module includes: a first determining unit, configured to determine whether the program unit is reversible, where reversibility of the program unit means that no instruction in the program unit includes a destructive operation; an obtaining unit, configured to: if the first determining unit determines that the program unit is irreversible, obtain an address of a first irreversible instruction in the program unit; and a second determining unit, configured to determine whether the address of the first irreversible instruction is after the address pointed to by the computer pointer, where the releasing module is specifically configured to: if the second determining unit determines that the address of the first irreversible instruction is after the address pointed to by the computer pointer or the first determining unit determines that the program unit is reversible, invoke the destruction program unit corresponding to the program unit, so as to release the resources applied for by the program unit.

With reference to the first possible implementation manner of the second aspect, in a second possible implementation manner of the second aspect, the first determining unit is specifically configured to obtain a reversible matrix of the program unit, and query whether the program unit is reversible in the reversible matrix, where the reversible matrix includes reversibility information of the program unit; and the obtaining unit is specifically configured to obtain a start address of the program unit and obtain an offset of the first irreversible instruction from the reversible matrix, and use a sum of the start address and the offset as the address of the first irreversible instruction.

With reference to the second aspect, in a third possible implementation manner of the second aspect, the internal memory includes a buffer memory and a random access memory; and the apparatus further includes an invalidating module, configured to obtain a cache address to which a storage address of data in the instructions between the first instruction and the current instruction in the program unit is mapped, and set a cache space pointed to by the cache address in the buffer memory to be invalid.

With reference to the third implementation manner of the second aspect, in a fourth possible implementation manner of the second aspect, the buffer memory includes a level-1 buffer memory and a level-2 buffer memory.

With reference to the second aspect, in a fifth possible implementation manner of the second aspect, the apparatus further includes: a resetting module, configured to: if the second determining module determines that an irreversible instruction exists between the first instruction and the current instruction in the program unit, or the first determining module determines that the abnormal instruction does not belong to the program unit, perform a system resetting operation to recover the abnormal data in the internal memory.

In the embodiments of the present invention, after receiving a data abort signal, a processor obtains an abnormality occurrence point and a program unit where the current instruction is located; and, when it is determined that the program unit is reversible or a first irreversible instruction in the program unit is after the current instruction, the processor causes a computer pointer to point back to the first instruction of the program unit, and re-executes the program unit. In this way, abnormal data in an internal memory can be overwritten by using correct data, and the abnormal data in the internal memory is recovered. Because the abnormal data in the internal memory is recovered without the need of a system resetting operation, the recovery speed is rapid, and application programs started in a process of using the system are basically not impacted, which causes little impact onto operations and enhances the capability of the system to resist data abnormality in the internal memory.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 1 is a flowchart of a first embodiment of a method for recovering abnormal data in an internal memory according to the present invention.

DETAILED DESCRIPTION

Figure 1:
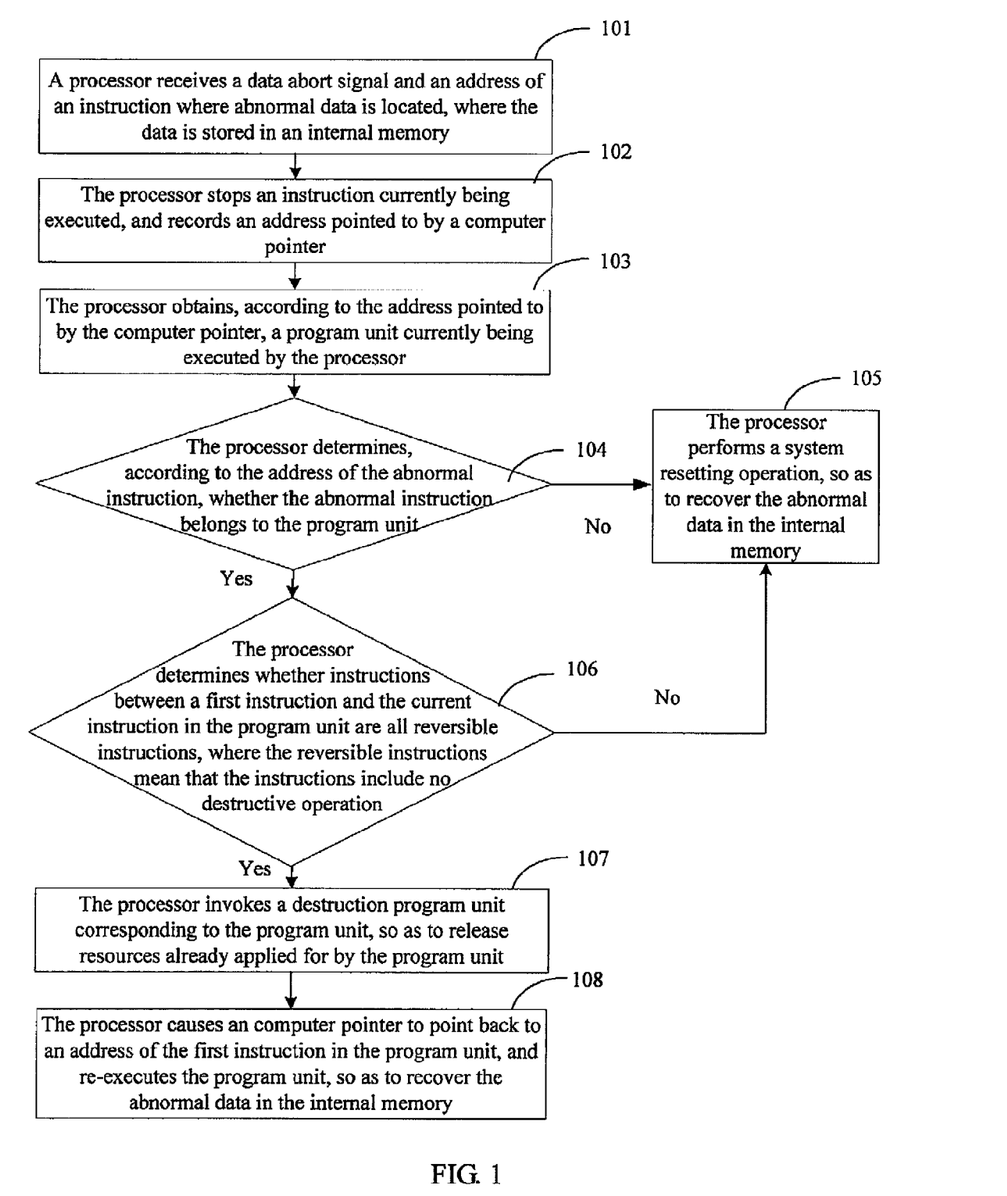

Referring to FIG. 1, FIG. 1 is a flowchart of a first embodiment of a method for recovering abnormal data in an internal memory according to the present invention. As shown in FIG. 1, the method includes the following steps:

Step 101: A processor receives a data abort signal and an address of an instruction where abnormal data is located, where the data is stored in an internal memory.

The internal memory is configured to store data for the processor to invoke. When the data in the internal memory is read, the data in the internal memory is checked according to a check algorithm, so as to determine whether the data in the internal memory is abnormal. In the embodiment of the present invention, the check algorithm is not limited, and may be a parity check algorithm, an error correcting code correction algorithm, and so on. After the check finds that the data in the internal memory is abnormal, an aborting system sends a data abort signal and abnormality site information to the processor, where the abnormality site information includes an address of an abnormal instruction where abnormal data is located. Here, the data abnormality refers to change of data which causes incorrect data. For example, soft failure occurs in a storage space in the internal memory, which leads to change of data in the storage space.

Further, in the embodiment of the present invention, an abnormality handling mechanism of the processor is a non-precise abnormality handling mechanism. The non-precise abnormality handling mechanism means that a time interval exists between an abnormality occurrence point and the processor's receipt of an abnormality signal, and in this time interval, the processor executes other instructions.

Step 102: The processor suspends a current instruction being executed, and records an address pointed to by a computer pointer.

After receiving the data abort signal, the processor suspends the current instruction being executed, and records the address pointed to by the computer pointer, and then proceeds to the subsequent abnormality handling mechanism. The manner of suspending, by the processor, the current instruction being executed may be: stopping the current instruction being executed or pausing the current instruct ion being executed, or the like. In the embodiment of the present invention, the address pointed to by the computer pointer is an address of the current instruction being executed by the processor.

Step 103: The processor obtains, according to the address pointed to by the computer pointer, a program unit currently being executed by the processor.

A computer program includes one or more program units, and one program unit includes one or more instructions, where the program unit may be a computer function. After a computer program is invoked from an external memory into an internal memory, a storage location of the computer program in the internal memory is relatively fixed. More specifically, a segment of the storage space of the internal memory is allocated to each program unit in the computer program, and a storage address is allocated to each instruction in the program unit. By querying which segment of the storage space includes the address pointed to by the computer pointer, the processor can obtain an address segment of the program unit currently being executed, and further obtain the program unit.

It should be noted that the instructions in the program unit are order-sensitive. Normally, the processor executes the instructions in the program unit according to an order.

Step 104: The processor determines, according to the address of the abnormal instruction, whether the abnormal instruction belongs to the program unit; and, if the abnormal instruction belongs to the program unit, proceeds to step 106; otherwise, proceeds to step 105.

Likewise, by querying whether the address of the abnormal instruction belongs to the storage space of the program unit, the processor can determine whether the abnormal instruction belongs to the program unit.

Step 105: The processor performs a system resetting operation, so as to recover the abnormal data in the internal memory.

If the abnormal instruction does not belong to the program unit, it indicates that the abnormal instruction is not in the same program unit as that of the current instruction being executed, and the processor will possibly execute instructions of other program units in a time interval between the abnormality occurrence point and the processor's receipt of the abnormality signal. Therefore, the processor performs a system resetting operation directly to recover the abnormal data in the internal memory.

Step 106: The processor determines whether instructions between a first instruction and the current instruction in the program unit are all reversible instructions, where the reversible instructions mean that the instructions include no destructive operation; and, if the instructions between the first instruction and the current instruction are all reversible instructions, proceeds to step 107; otherwise, proceeds to step 105.

The execution of an instruction generally includes three stages, which are respectively: reading from the internal memory data that needs to be used by the instruction, operating the data, and writing data back to the internal memory.

An instruction that includes a destructive operation refers to an instruction that cannot eliminate impact of an original operation by re-executing the instruction, for example, instructions of an automatic update type, and instructions of IO-type operations. As regards the instructions of an automatic update type, such as a=a+1, an execution process is: reading data of a from the internal memory, adding 1 to the data of a, and writing the data back to the internal memory after 1 is added to the data. If an initial value of a is 0, after the a=a+1 instruction is executed for once, the value of a changes to 1; after a=a+1 is executed for a second time, the value of a changes to 2, which is equivalent to that, when the a=a+1 instruction is executed for once, the data of a in the internal memory changes for once, which damages the original data of a.

After obtaining the program unit, the processor may determine, one by one according to the order of the instructions in the program unit, whether the instructions between the first instruction and the current instruction include a destructive operation.

Step 107: The processor invokes a destruction program unit corresponding to the program unit, so as to release resources already applied for by the program unit.

Opposite to the program unit, the destruction program unit is configured to release the resources applied for by the program unit, for example, signal quantity, input/output resources, and so on. The destruction program unit mentioned here further includes a determination instruction, which is used to determine whether the resources that need to be applied for by the program unit have been applied for by the program unit. Only resources that have been applied for by the program unit are allowed to be released.

Step 108: The processor causes the computer pointer to point back to the address of the first instruction in the program unit, and re-executes the program unit, so as to recover the abnormal data in the internal memory.

When the processor causes the computer pointer to point back to the address of the first instruction in the program unit, the processor re-executes the instructions onwards one by one according to the order of the instructions in the program unit, which is equivalent to re-executing the program unit, so as to overwrite the abnormal data in the internal memory by using correct data and recover the abnormal data in the internal memory.

In the embodiment of the present invention, after receiving a data abort signal, the processor obtains the program unit where an abnormality occurrence point is located; and, when it is determined that the program unit is reversible, the processor causes the computer pointer to point back to the first instruction of the program unit, and re-executes the program unit. In this way, abnormal data in an internal memory is overwritten by using correct data, and the abnormal data in the internal memory is recovered. Because the abnormal data in the internal memory is recovered without the need of a system resetting operation, the recovery speed is rapid, and application programs started in a process of using the system are basically not impacted, which causes little impact onto operations and enhances the capability of the system to resist data abnormality in the internal memory.

Figure 2A:
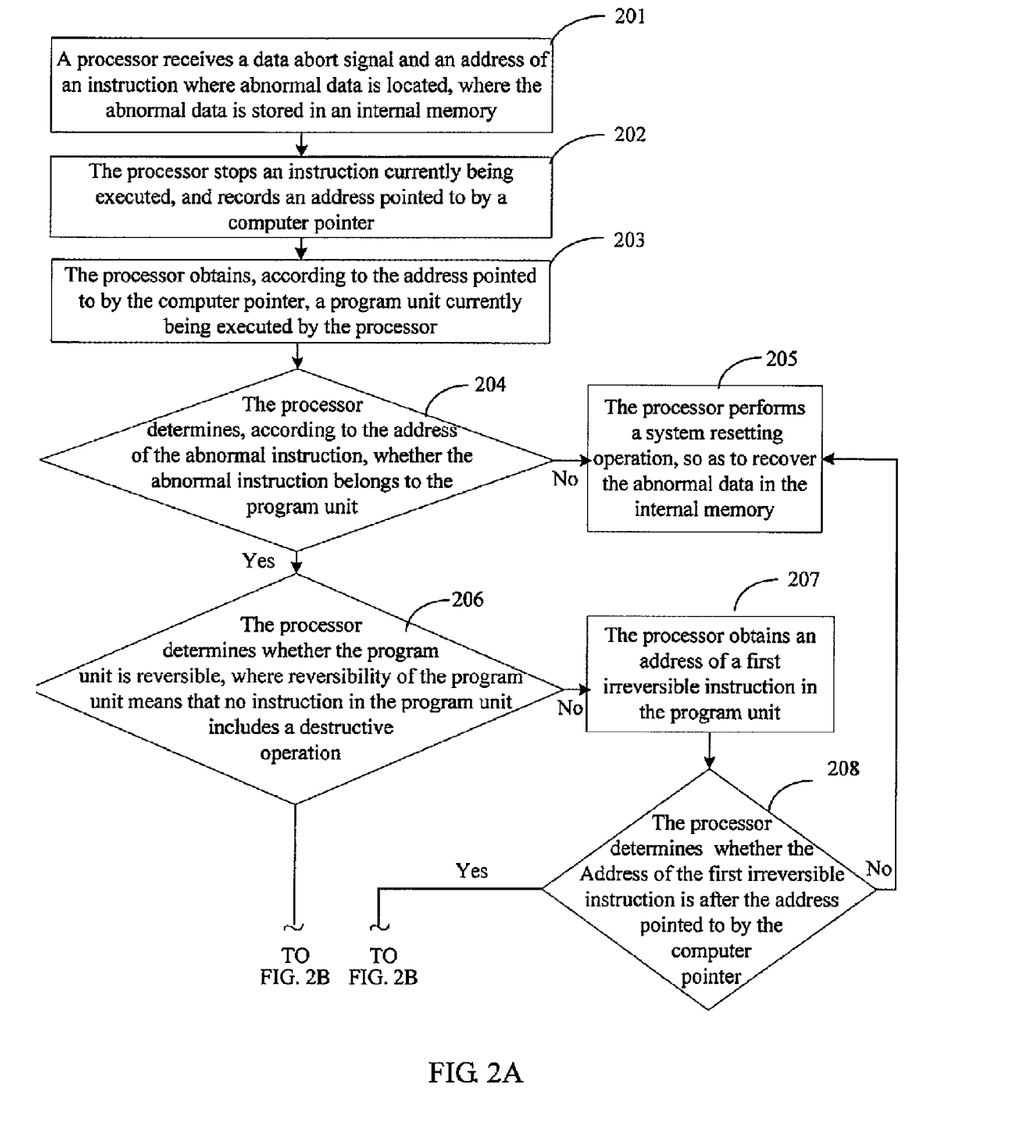
FIG. 2A and FIG. 2B are a flowchart of a second embodiment of a method for recovering abnormal data in an internal memory according to the present invention.
Figure 2B:
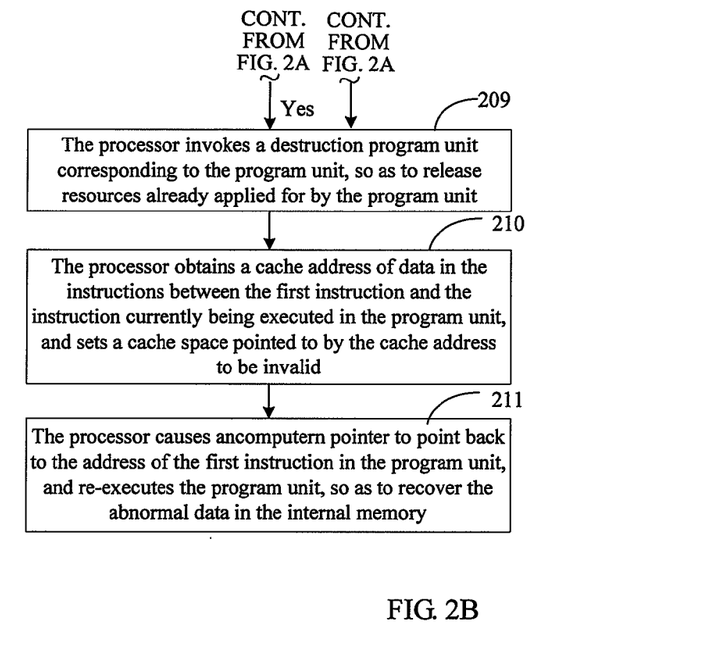

Referring to FIG. 2A and FIG. 2B, FIG. 2A and FIG. 2B are a flowchart of a second embodiment of a method for recovering abnormal data in an internal memory according to the present invention. As shown in FIG. 2A and FIG. 2B, the method includes the following steps:

Step 201: A processor receives a data abort signal and an address of an instruction where abnormal data is located, where the abnormal data is stored in an internal memory.

The internal memory is configured to store data that is run by the processor. In the embodiment of the present invention, the internal memory includes a random memory and a buffer memory. When the data in the internal memory is read, the data in the internal memory that is read is checked to determine whether the data in the internal memory is abnormal. Here, the abnormality refers to soft failure that occurs in a part of the storage space in the internal memory, which results in change of the data in this part of the storage space and leads to incorrect data. The damage caused by the soft failure of the internal memory to the internal memory is not permanent, as long as correct data is written into the internal memory to overwrite the varied data.

Further, in the embodiment of the present invention, an abnormality handling mechanism is a non-precise abnormality handling mechanism. The non-precise abnormality handling mechanism means that a time interval exists between an abnormality occurrence point and the processor's receipt of an abnormality signal, and in this time interval, the processor continues to execute other instructions.

Step 202: The processor suspends a current instruction being executed, and records an address pointed to by a computer pointer.

The computer pointer is configured to instruct the processor to execute an instruction, and the address pointed to by the computer pointer is an address of the current instruction being executed by the processor. When the processor has already finished executing the current instruction, the computer pointer points to an address of a next instruction, and the processor goes on to execute the next instruction.

After receiving the data abort signal, the processor suspends the current instruction being executed, and records the address pointed to by the computer pointer, and then proceeds to the subsequent abnormality handling mechanism.

Step 203: The processor obtains, according to the address pointed to by the computer pointer, a program unit currently being executed by the processor.

After the computer program is invoked into the internal memory, a segment of the storage space of the internal memory is allocated to each program unit in the computer program, and a storage address is allocated to each instruction in the program unit. Generally, the storage space of the program unit is a continuous segment of the storage space. Therefore, by querying which segment of the storage space includes the address pointed to by the computer pointer, the processor can determine the program unit to which the current instruction belongs, and further obtain the program unit.

Step 204: The processor determines, according to the address of the abnormal instruction, whether the abnormal instruction belongs to the program unit; and, if the abnormal instruction belongs to the program unit, proceeds to step 206; otherwise, proceeds to step 205.

After the computer program is invoked into the internal memory, the storage space allocated to the program unit in the computer program is relatively fixed, the processor can determine, by querying whether the address of the abnormal instruction belongs to the storage space of the program unit, whether the abnormal instruction belongs to the program unit.

Step 205: The processor performs a system resetting operation, so as to recover the abnormal data in the internal memory.

When the abnormal instruction does not belong to the same program unit as that of the current instruction, the processor will possibly execute a different program unit or even multiple program units in a time interval between the abnormality point and the receipt of the abnormality signal. Therefore, the processor performs a system resetting operation to recover the abnormal data in the internal memory. The time interval between the abnormality point and the receipt of the abnormality signal should not be too long. Generally, the time interval is a duration of five instructions, or may be a duration of other numbers of instructions.

Step 206: The processor determines whether the program unit is reversible, where reversibility of the program unit means that no instruction in the program unit includes a destructive operation; and, if the program unit is reversible, proceeds to step 209; otherwise, proceeds to step 207.

The execution of an instruction generally includes three stages, which are respectively: reading from the internal memory data that needs to be used by the instruction, operating the data, and writing data back to the internal memory.

An instruction that includes a destructive operation refers to an instruction that cannot eliminate impact of an original operation by re-executing the instruction. To put it simply, when the data is not abnormal, when the same instruction is re-executed, the output result changes. For example, for a=a+1, an execution process is: reading data of a from the internal memory, adding 1 to the data of a, and writing the data back to the internal memory after 1 is added to the data. If an initial value of a is 0, after the a=a+1 instruction is executed for once, the value of a changes to 1; after a=a+1 is executed for a second time, the value of a changes to 2, which is equivalent to that, when the a=a+1 instruction is executed for once, the stored data of a changes for once, which damages the original data of a.

Reversibility of the program unit means that no instruction in the program unit includes a destructive operation, for example, program unit void IdleWaitEvent (void):

```
{
    if ( ulBackCount != g_ulIdleCount)
    {
    g_ulIdleCount =0;
    }
    else
    {
    g_ulIdleCount =g_bNeedDispatcher + ubyDelay;
    }
}
``` where, no destructive operation is included in the ulBackCount !=g_ulIdleCount instruction, the g_ulIdleCount=0 instruction, or the g_ulIdleCount=g_bNeedDispatcher+ubyDelay instruction in the program unit void IdleWaitEvent (void). Therefore, when the data is not abnormal, the output result of the program unit is the same no matter how many times the program unit is re-executed. The program unit void IdleWaitEvent (void) is reversible.

For another example, program unit: void bspread (void)

```
{
    ......
    Icount ++; //icount is a global variable
    ......
}
``` where, Icount is a global variable, and the Icount++ instruction includes a destructive operation. Each time the program unit is executed, the output result of the program unit void bspread (void) is different. The program unit void bspread (void) is irreversible.

Step 207: The processor obtains an address of a first irreversible instruction in the program unit.

Because the instructions in the program unit are order-sensitive, it may be determined, one by one according to the order of the instructions in the program unit, whether the instructions include a destructive operation, so as to obtain the address of the first irreversible instruction in the program unit. If many branches are included inside the program unit, all instructions in a common part are reversible, and all irreversible instructions exist inside the branches, then the first irreversible instruction refers to the first irreversible instruction inside each branch.

Step 208: The processor determines whether the address of the first irreversible instruction is after the address pointed to by the computer pointer, and if the address of the first irreversible instruction is after the address pointed to by the computer pointer, proceeds to step 209; otherwise, proceeds to step 205.

If the address of the first irreversible instruction is after the address pointed to by the computer pointer, it indicates that all instructions executed by the processor in the program unit are reversible instructions.

In another implementation, a reversible matrix of each program unit may be created at a system development stage, and the reversible matrix is cured into the system, where the reversible matrix includes reversibility information of the program unit, for example, whether the program unit is reversible, and, if the program unit is irreversible, the reversible matrix includes an offset of the first irreversible instruction in the program unit, and the like.

Then, step 206 may also be that the processor obtains a reversible matrix of the program unit, and queries whether the program unit is reversible in the reversible matrix of the program unit, where the reversible matrix includes reversibility information of the program unit.

Then, step 207 may also be that the processor obtains a start address of the program unit and obtains an offset of the first irreversible instruction from the reversible matrix, and uses a sum of the start address and the offset as the address of the first irreversible instruction.

Step 209: The processor invokes a destruction program unit corresponding to the program unit, so as to release resources already applied for by the program unit.

The destruction program unit is configured to release the resources applied for by the program unit. The destruction program unit mentioned here further includes a determination instruction, which is used to determine whether the resources required by the program unit have been applied for by the program unit. Only the resources that have been applied for by the program unit are allowed to be released.

Step 210: The processor obtains a cache address of data in the instructions between the first instruction and the current instruction being executed in the program unit, and sets a cache space pointed to by the cache address in a buffer memory to be invalid.

The internal memory includes a random memory and a buffer memory, where the buffer memory is configured to cache data, so as to increase a speed of the processor in reading and writing data. A mapping table is created between the buffer memory and the random memory, where the mapping table corresponds to a mapping relationship between the buffer memory and the random memory. After the storage address of the data is obtained, a cache address of the data can be further obtained by searching the mapping table. In the embodiment of the present invention, the buffer memory includes a level-1 buffer memory and a level-2 buffer memory; and the setting a cache space pointed to by the cache address in a buffer memory to be invalid refers to: setting the cache space pointed to by the cache address in the buffer memory to an available state.

Step 211: The processor causes the computer pointer to point back to the address of the first instruction in the program unit, and re-executes the program unit, so as to recover the abnormal data in the internal memory.

After the computer pointer points to the address of the first instruction in the program unit, the processor re-executes the program unit by beginning with the first instruction, and overwrites the abnormal data in the internal memory by using normal data.

In the embodiment of the present invention, after receiving a data abort signal and an address of an abnormal instruction, the processor obtains a program unit that includes the abnormal instruction and a program unit that includes the current instruction; and, when it is determined that the program unit is reversible or a first irreversible instruction in the program unit is after the current instruction, the processor causes a computer pointer to point back to the first instruction of the program unit, and re-executes the program unit. In this way, abnormal data in an internal memory can be overwritten by using correct data, and the abnormal data in the internal memory is recovered. Because the abnormal data in the internal memory is recovered without the need of a system resetting operation, the recovery speed is rapid, and application programs started in a process of using the system are basically not impacted, which causes little impact onto operations and enhances the capability of the system to resist data abnormality in the internal memory.

Figure 3:
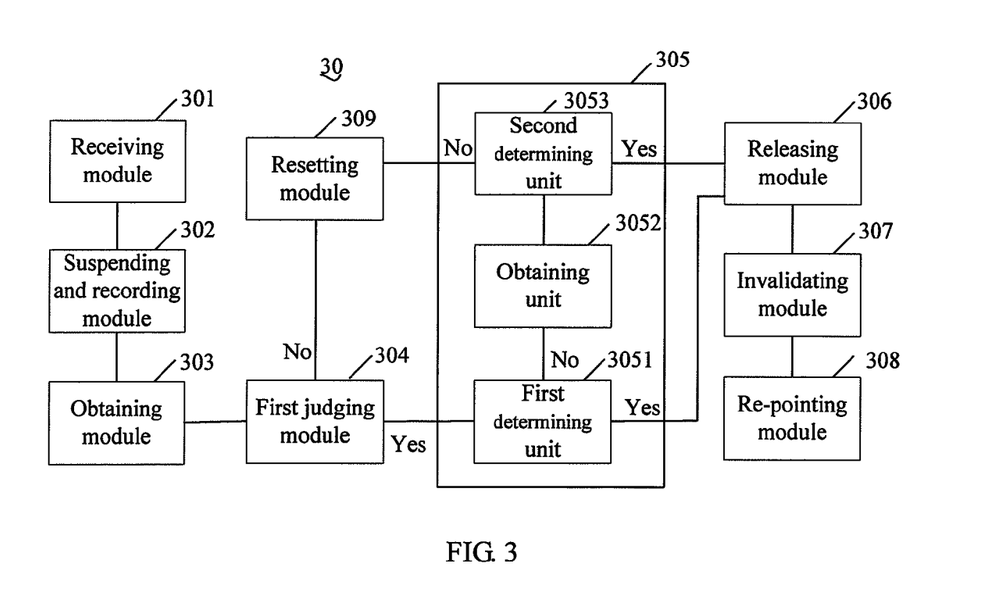
FIG. 3 is a schematic structural diagram of a first embodiment of an apparatus for recovering abnormal data in an internal memory according to the present invention.

Referring to FIG. 3, FIG. 3 is a schematic structural diagram of an apparatus for recovering abnormal data in an internal memory according to the present invention. As shown in FIG. 3, the apparatus 30 includes a receiving module 301, a suspending and recording module 302, an obtaining module 303, a first determining module 304, a second determining module 305, a releasing module 306, and a re-pointing module 308.

The receiving module 301 receives a data abort signal and an address of an abnormal instruction where abnormal data is located, where the abnormal data is stored in the internal memory. When the data in the internal memory is read, the data is checked according to a check algorithm to determine whether the data is abnormal. Here, the data abnormality refers to change of data in the internal memory which causes incorrect data. For example, soft failure occurs in the internal memory, which leads to variation of the data, or, the internal memory is varied for other reasons.

The suspending and recording module 302 suspends a current instruction being executed, and records an address pointed to by a computer pointer, where the address pointed to by the computer pointer is also an address of the current instruction. The obtaining module 303 obtains, according to the address pointed to by the computer pointer, a program unit currently being executed by the processor. When the program unit is invoked into the internal memory, a segment of the storage space of the internal memory is used to store the program unit. The obtaining module 303 obtains, by determining which storage space includes the address pointed to by the computer pointer, an address segment of the program unit and further obtains the program unit.

The first determining module 304 determines, according to the address of the abnormal instruction, whether the abnormal instruction belongs to the program unit. When the first determining module 304 determines that the abnormal instruction belongs to the program unit, the second determining module 305 determines whether instructions between the first instruction and the current instruction in the program unit are all reversible instructions, where the reversible instructions mean that the instructions include no destructive operation. For description about reversible instructions and irreversible instructions, reference may be made to the description about the first embodiment of the method for recovering abnormal data in an internal memory, and no repeated description is given here any further.

If the second determining module 305 determines that the instructions between the first instruction and the current instruction in the program unit are all reversible instructions, the releasing module 306 invokes a destruction program unit corresponding to the program unit, so as to release resources already applied for by the program unit. The re-pointing module 310 causes the computer pointer to point back to an address of the first instruction in the program unit, so as to re-execute the program unit and recover the abnormal data in the internal memory.

Further, the second determining module 305 may further include a first determining unit 3051, an obtaining unit 3052, and a second determining unit 3053. When the first determining module 304 determines that the abnormal instruction belongs to the program unit, the first determining unit 3051 determines whether the program unit is reversible, where reversibility of the program unit means that no instruction in the program unit includes a destructive operation. When the first determining unit 3051 determines that the program unit is irreversible, the obtaining unit 3052 obtains the address of the first irreversible instruction in the program unit. The second determining unit 3053 determines whether the address of the first irreversible instruction is after the address pointed to by the computer pointer. Then, when the first determining unit 3051 determines that the program unit is reversible or the second determining unit 3052 determines that the address of the first irreversible instruction is after the address pointed to by the computer pointer, the releasing module 306 specifically invokes the destruction program unit corresponding to the program unit, so as to release the resources already applied for by the program unit.

In another embodiment, a reversible matrix of the program unit may be created at a system development stage, and the reversible matrix is cured into the system, where the reversible matrix includes reversibility information of the program unit, for example, whether the program unit is reversible, and, if the program unit is irreversible, the reversible matrix includes an offset of the first irreversible instruction, and the like.

Then, the first determining unit 3051 may further be specifically configured to obtain a reversible matrix of the program unit, and query whether the program unit is reversible in the reversible matrix of the program unit, where the reversible matrix includes reversibility information of the program unit.

The obtaining unit 305 may further be specifically configured to obtain a start address of the program unit and obtain an offset of the first irreversible instruction from the reversible matrix, and use a sum of the start address and the offset as the address of the first irreversible instruction.

Further, in the embodiment of the present invention, the internal memory includes a buffer memory and a random access memory, where the buffer memory further includes a level-1 buffer memory and a level-2 buffer memory. A mapping relationship exists between the buffer memory and the random access memory. The apparatus 30 further includes an invalidating module 307 and a resetting module 309.

After the releasing module 308 releases the resources already applied for by the program unit, and before the re-pointing module 310 causes the computer pointer to point back to the address of the first instruction of the program unit, the invalidating module 307 obtains a cache address to which a storage address of data in the instructions between the first instruction and the current instruction in the program unit is mapped, and sets a cache space pointed to by the cache address in the buffer memory to be invalid.

When the first determining module 304 determines that the abnormal instruction does not belong to the program unit, or the second determining module 305 determines that an irreversible instruction exists between the first instruction and the current instruction in the program unit, the resetting module 309 performs a system resetting operation, so as to recover the abnormal data in the internal memory.

In the embodiment of the present invention, after the receiving module 301 receives a data abort signal and an abnormal instruction, the program unit where the current instruction and the abnormal instruction are located is obtained, and, when it is determined that the program unit is reversible or that the first irreversible instruction in the program unit is after the current instruction, the program unit is re-executed. In this way, abnormal data in an internal memory can be overwritten by using correct data, and the abnormal data in the internal memory is recovered. Because the abnormal data in the internal memory is recovered without the need of a system resetting operation, the recovery speed is rapid, and application programs started in a process of using the system are basically not impacted, which causes little impact onto operations and enhances the capability of the system to resist data abnormality in the internal memory.

Figure 4:
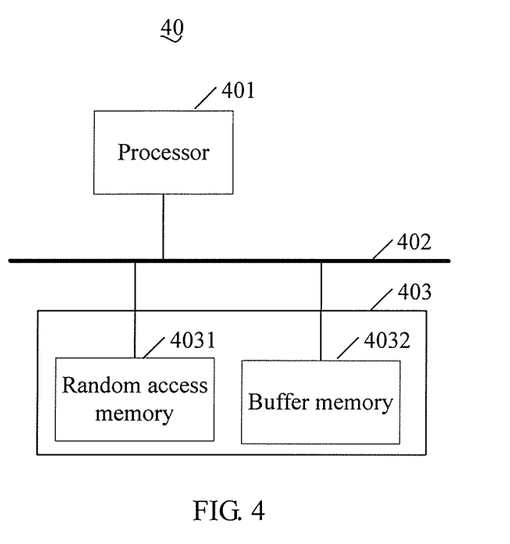
FIG. 4 is a schematic structural diagram of a second embodiment of an apparatus for recovering abnormal data in an internal memory according to the present invention.

Referring to FIG. 4, FIG. 4 is a schematic structural diagram of a second embodiment of an apparatus for recovering abnormal data in an internal memory according to the present invention. As shown in FIG. 4, the apparatus 40 includes a processor 401, a bus 402, and an internal memory 403. The internal memory 403 and the processor 401 are both connected to the bus 402.

The processor 401 is configured to receive a data abort signal and an address of an abnormal instruction where abnormal data is located, where the abnormal data is stored in the internal memory 403; suspend a current instruction being executed, and record an address pointed to by a computer pointer; obtain, according to the address pointed to by the computer pointer, a program unit currently being executed by the processor; determine, according to the address of the abnormal instruction, whether the abnormal instruction belongs to the program unit; if the abnormal instruction belongs to the program unit, determine whether instructions between a first instruction and the current instruction in the program unit are all reversible instructions, where the reversible instructions mean that the instructions include no destructive operation; if the instructions between the first instruction and the current instruction in the program unit are all reversible instructions, invoke a destruction program unit corresponding to the program unit, so as to release resources already applied for by the program unit; and cause the computer pointer to point back to an address of the first instruction in the program unit, and re-execute the program unit, so as to recover the abnormal data in the internal memory.

Further, the internal memory 403 includes a random access memory 4031 and a buffer memory 4032. The random access memory 4031 and the buffer memory 4032 are both connected to the bus 402. Then, after the step of invoking the destruction program unit corresponding to the program unit, and before the step of causing the computer pointer to point to the address of the first instruction of the program unit, the processor obtains, from a cache-storage mapping table, a cache address of data in all instructions between the first instruction and the current instruction being executed in the program unit, and sets a cache space pointed to by the cache address in the buffer memory to be invalid.

The processing process implemented by the processor 401 is generally performed under control of a program, where the program is stored in the internal memory 401. When the foregoing actions need to be performed, the program is invoked into the processor 401, and is executed under control of the processor 401. Certainly, the processing process may also be implemented by hardware.

The foregoing descriptions are merely embodiments of the present invention, but are not intended to limit the patent scope of the present invention. Any equivalent structures or equivalent process variations obtained by using the content of this specification and the accompanying drawings of the present invention, or direct or indirect application of them in other relevant technical fields, shall fall within the patent protection scope of the present invention.

What is claimed is:

1. A method for recovering abnormal data in an internal random access memory (RAM), the method comprising:
   reading data stored in a first portion of the internal RAM, the first portion storing at least one instruction;
   checking the read data and, when it is determined that the read data is abnormal, generating an abnormality signal;
   receiving, by a processor, the abnormality signal and an address of the at least one instruction;
   suspending, by the processor, a current instruction being executed, and recording an address pointed to by a computer pointer;
   obtaining, by the processor according to the address pointed to by the computer pointer, an address segment of a program unit currently being executed by the processor;
   determining, by the processor, whether the address of the at least one instruction belongs to the program unit;
   when the address of the at least one instruction belongs to the program unit, determining, by the processor, whether instructions between a first instruction and the current instruction in the program unit are all reversible instructions;
   when the instructions are all reversible instructions, invoking, by the processor, a destruction program unit corresponding to the program unit;
   causing, by the processor, the computer pointer to point back to an address of the first instruction in the program unit, and re-executing the program unit, to recover the abnormal data in the internal memory; wherein:
   determining, by the processor, whether instructions between a first instruction and the current instruction in the program unit are all reversible instructions comprises:
      determining, by the processor, whether the program unit is reversible, wherein reversibility of the program unit means that no instruction in the program unit comprises a destructive operation, and
      when the program unit is irreversible, obtaining, by the processor, an address of a first irreversible instruction in the program unit, and determining whether the address of the first irreversible instruction is after the address pointed to by the computer pointer; and
   invoking, by the processor, the destruction program unit corresponding to the program unit comprises:
      when the program unit is reversible or the address of the first irreversible instruction is after the address pointed to by the computer pointer, invoking, by the processor, the destruction program unit corresponding to the program unit, to release resources already applied for by the program unit.

2. The method according to claim 1, wherein:
determining, by the processor, whether the program unit is reversible comprises:
   obtaining, by the processor, a reversible matrix of the program unit, and querying whether the program unit is reversible in the reversible matrix of the program unit, wherein the reversible matrix comprises reversibility information of the program unit; and obtaining, by the processor, an address of a first irreversible instruction in the program unit comprises:
obtaining, by the processor, a start address of the program unit, and obtaining an offset of the first irreversible instruction from the reversible matrix, and
using, by the processor, a sum of the start address and the offset as the address of the first irreversible instruction.

3. A method for recovering abnormal data in an internal random access memory (RAM), the method comprising:
reading data stored in a first portion of the internal RAM, the first portion storing at least one instruction;
checking the read data and, when it is determined that the read data is abnormal, generating an abnormality signal;
receiving, by a processor, the abnormality signal and an address of the at least one instruction;
suspending, by the processor, a current instruction being executed, and recording an address pointed to by a computer pointer;
obtaining, by the processor according to the address pointed to by the computer pointer, an address segment of a program unit currently being executed by the processor;
determining, by the processor, whether the address of the at least one instruction belongs to the program unit;
when the address of the at least one instruction belongs to the program unit, determining, by the processor, whether instructions between a first instruction and the current instruction in the program unit are all reversible instructions;
when the instructions are all reversible instructions, invoking, by the processor, a destruction program unit corresponding to the program unit;
causing, by the processor, the computer pointer to point back to an address of the first instruction in the program unit, and re-executing the program unit, to recover the abnormal data in the internal memory; wherein:
the internal memory comprises a buffer memory; and
after invoking, by the processor, a destruction program unit corresponding to the program unit, and, before causing, by the processor, the computer pointer to point back to an address of the first instruction in the program unit, the method further comprises:
obtaining, by the processor from a cache-storage mapping table, a cache address of data in the instructions between the first instruction and the current instruction in the program unit, and setting a cache space pointed to by the cache address in the buffer memory to be invalid.

4. The method according to claim 3, wherein:
the buffer memory comprises a level-1 buffer memory and a level-2 buffer memory.

5. A method for recovering abnormal data in an internal random access memory (RAM), the method comprising:
reading data stored in a first portion of the internal RAM, the first portion storing at least one instruction;
checking the read data and, when it is determined that the read data is abnormal, generating an abnormality signal;
receiving, by a processor, the abnormality signal and an address of the at least one instruction;

suspending, by the processor, a current instruction being executed, and recording an address pointed to by a computer pointer;
obtaining, by the processor according to the address pointed to by the computer pointer, an address segment of a program unit currently being executed by the processor;
determining, by the processor, whether the address of the at least one instruction belongs to the program unit;
when the address of the at least one instruction belongs to the program unit, determining, by the processor, whether instructions between a first instruction and the current instruction in the program unit are all reversible instructions;
when the instructions are all reversible instructions, invoking, by the processor, a destruction program unit corresponding to the program unit;
causing, by the processor, the computer pointer to point back to an address of the first instruction in the program unit, and re-executing the program unit, to recover the abnormal data in the internal memory; and
wherein when an irreversible instruction exists between the first instruction and the current instruction in the program unit, or the address of the at least one instruction does not belong to the program unit, performing, by the processor, a system resetting operation, to recover the abnormal data in the internal memory.

6. An apparatus for recovering abnormal data in an internal random access memory (RAM), the apparatus comprising:
a processor;
memory coupled to the processor, the memory comprising instructions that, when executed by the processor, cause the apparatus to:
receive an abnormality signal and an address of an abnormal instruction where abnormal data is located, the abnormality signal generated in response to reading data stored in a first portion of the internal RAM, checking the read data, and determining that the read data is abnormal,
suspend a current instruction being executed, and record an address pointed to by a computer pointer,
obtain, according to the address pointed to by the computer pointer, a program unit currently being executed by a processor,
determine, according to the address of the abnormal instruction, whether the abnormal instruction belongs to the program unit,
when the abnormal instruction belongs to the program unit, determine whether instructions between a first instruction and the current instruction in the program unit are all reversible instructions,
when the instructions between the first instruction and the current instruction in the program unit are all reversible instructions, invoke a destruction program unit corresponding to the program unit,
cause the computer pointer to point back to an address of the first instruction in the program unit, to re-execute the program unit and recover the abnormal data in the internal memory,
determine whether the program unit is reversible, wherein reversibility of the program unit means that no instruction in the program unit comprises a destructive operation,
when the program unit is irreversible, obtain an address of a first irreversible instruction in the program unit, determine whether the address of the first irreversible instruction is after the address pointed to by the computer pointer, and when the address of the first irreversible instruction is after the address pointed to by the computer pointer or the program unit is reversible, invoke the destruction program unit corresponding to the program unit, to release resources already applied for by the program unit.

7. The apparatus according to claim 6, wherein the memory further comprises instructions that, when executed by the processor, cause the apparatus to:

obtain a reversible matrix of the program unit, and query whether the program unit is reversible in the reversible matrix, wherein the reversible matrix comprises reversibility information of the program unit; and obtain a start address of the program unit and obtain an offset of the first irreversible instruction from the reversible matrix, and use a sum of the start address and the offset as the address of the first irreversible instruction.

8. An apparatus for recovering abnormal data in an internal random access memory (RAM), the apparatus comprising:

a processor;

memory coupled to the processor, the memory comprising instructions that, when executed by the processor, cause the apparatus to:

receive an abnormality signal and an address of an abnormal instruction where abnormal data is located, the abnormality signal generated in response to reading data stored in a first portion of the internal RAM, checking the read data, and determining that the read data is abnormal, suspend a current instruction being executed, and record an address pointed to by a computer pointer, obtain, according to the address pointed to by the computer pointer, a program unit currently being executed by a processor, determine, according to the address of the abnormal instruction, whether the abnormal instruction belongs to the program unit, when the abnormal instruction belongs to the program unit, determine whether instructions between a first instruction and the current instruction in the program unit are all reversible instructions, when the instructions between the first instruction and the current instruction in the program unit are all reversible instructions, invoke a destruction program unit corresponding to the program unit, and cause the computer pointer to point back to an address of the first instruction in the program unit, to re-execute the program unit and recover the abnormal data in the internal memory, wherein the internal memory comprises a buffer memory, and obtain a cache address to which a storage address of data in the instructions between the first instruction and the current instruction in the program unit is mapped, and set a cache space pointed to by the cache address in the buffer memory to be invalid.

9. The apparatus according to claim 8, wherein the buffer memory comprises a level-1 buffer memory and a level-2 buffer memory.

10. An apparatus for recovering abnormal data in an internal random access memory (RAM), the apparatus comprising:

a processor;

memory coupled to the processor, the memory comprising instructions that, when executed by the processor, cause the apparatus to:

receive an abnormality signal and an address of an abnormal instruction where abnormal data is located, the abnormality signal generated in response to reading data stored in a first portion of the internal RAM, checking the read data, and determining that the read data is abnormal, suspend a current instruction being executed, and record an address pointed to by a computer pointer, obtain, according to the address pointed to by the computer pointer, a program unit currently being executed by a processor, determine, according to the address of the abnormal instruction, whether the abnormal instruction belongs to the program unit, when the abnormal instruction belongs to the program unit, determine whether instructions between a first instruction and the current instruction in the program unit are all reversible instructions, when the instructions between the first instruction and the current instruction in the program unit are all reversible instructions, invoke a destruction program unit corresponding to the program unit, cause the computer pointer to point back to an address of the first instruction in the program unit, to re-execute the program unit and recover the abnormal data in the internal memory, and when an irreversible instruction exists between the first instruction and the current instruction in the program unit, or the abnormal instruction does not belong to the program unit, perform a system resetting operation to recover the abnormal data in the internal memory.

* * * * *